(12) United States Patent
Gao et al.

(10) Patent No.: US 12,500,957 B2
(45) Date of Patent: Dec. 16, 2025

(54) SYSTEM AND METHOD FOR RESPONDING TO AN APPLICATION PROGRAMMING INTERFACE REQUEST

(71) Applicant: The Toronto-Dominion Bank, Toronto (CA)

(72) Inventors: Kang Gao, Markham (CA); Carlton Anthony Raymond, Mississauga (CA); Scott Bradley Atkins, Toronto (CA); Andrew J. Kelly, Toronto (CA); Percy Richard Golding, Oakville (CA); Vitali Valoshyn, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 24 days.

(21) Appl. No.: 18/472,455

(22) Filed: Sep. 22, 2023

(65) Prior Publication Data
US 2025/0106293 A1    Mar. 27, 2025

(51) Int. Cl.
*G06F 15/16* (2006.01)
*H04L 67/02* (2022.01)
*H04L 67/141* (2022.01)

(52) U.S. Cl.
CPC ............ *H04L 67/141* (2013.01); *H04L 67/02* (2013.01)

(58) Field of Classification Search
CPC .............................. H04L 67/141; H04L 67/02
USPC ........................................................ 709/217
See application file for complete search history.

(56) References Cited

U.S. PATENT DOCUMENTS

| | | | |
|---|---|---|---|
| 11,055,113 B1 * | 7/2021 | Scarfutti | H04L 67/02 |
| 11,315,119 B1 | 4/2022 | Hendry et al. | |
| 11,386,490 B1 | 7/2022 | Plante et al. | |
| 11,423,365 B2 | 8/2022 | Fidanza et al. | |
| 11,625,772 B1 | 4/2023 | Hendry et al. | |
| 11,657,180 B1 | 5/2023 | Mehta et al. | |
| 11,663,602 B2 | 5/2023 | Hindi et al. | |
| 11,902,306 B1 * | 2/2024 | Satish | H04L 63/1425 |
| 2010/0076895 A1 | 3/2010 | Spencer et al. | |
| 2016/0171555 A1 | 6/2016 | Buerger et al. | |
| 2024/0070338 A1 * | 2/2024 | Chillar | G06F 30/13 |
| 2024/0291806 A1 * | 8/2024 | Sethi | H04L 9/321 |

* cited by examiner

*Primary Examiner* — Alan S Chou
(74) *Attorney, Agent, or Firm* — Rowand LLP (57) ABSTRACT

A computer system comprises at least one processor; a communications module coupled to the at least one processor; and a memory coupled to the at least one processor and storing processor-executable instructions which, when executed by the at least one processor, configure the at least one processor to receive, via the communications module and from a client device, an application programming interface request that defines parameters associated with a data request; obtain, via the communications module, real-time data from a real-time data hub based on the parameters associated with the data request; obtain, via the communications module, non-real-time data from a data store based on the parameters associated with the data request; aggregate the real-time data and the non-real-time data according to predefined aggregation rules to generate aggregate data; and send, via the communications module and to the client device, the aggregate data as a response to the application programming interface request.

20 Claims, 5 Drawing Sheets

SYSTEM AND METHOD FOR RESPONDING TO AN APPLICATION PROGRAMMING INTERFACE REQUEST

TECHNICAL FIELD

The present application relates to systems and methods for responding to an application programming interface request.

BACKGROUND

Data is often requested from a client device. The data may be obtained from a large number of data providers. The data may be in a number of different formats thus making it difficult to process.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Accordingly, in one aspect there is provided a computer system comprising at least one processor; a communications module coupled to the at least one processor; and a memory coupled to the at least one processor and storing processor-executable instructions which, when executed by the at least one processor, configure the at least one processor to receive, via the communications module and from a client device, an application programming interface request that defines parameters associated with a data request; obtain, via the communications module, real-time data from a real-time data hub based on the parameters associated with the data request; obtain, via the communications module, non-real-time data from a data store based on the parameters associated with the data request; aggregate the real-time data and the non-real-time data according to predefined aggregation rules to generate aggregate data; and send, via the communications module and to the client device, the aggregate data as a response to the application programming interface request.

In one or more embodiments, the processor-executable instructions, when executed by the at least one processor, configure the at least one processor to select a particular application programming interface to complete the data request.

In one or more embodiments, the particular application programming interface is selected based on the parameters associated with the data request.

In one or more embodiments, the application programming interface request includes a header specifying a particular format for the response to the application programming interface request.

In one or more embodiments, when aggregating the real-time data and the non-real-time data, the processor-executable instructions, when executed by the at least one processor, configure the at least one processor to translate the aggregate data into the particular format.

In one or more embodiments, the parameters associated with the data request include at least one identifier for the data request.

In one or more embodiments, the processor-executable instructions, when executed by the at least one processor, configure the at least one processor to send the aggregate data to a decision engine to make a real-time decision.

In one or more embodiments, at least a portion of the real-time data is obtained from the real-time data hub in communication with one or more real-time data provider computer systems.

In one or more embodiments, at least a portion of the non-real-time data is obtained from a data store.

In one or more embodiments, at least a portion of the real-time data is obtained from an open banking module in communication with one or more open banking computer systems.

In one or more embodiments, the real-time data includes at least one of a balance of a bank account, an indication as to whether a customer has applied for one or more banking products within a particular time period, or an indication as to whether a fraud alert has been raised for one or more banking products associated with the customer.

According to another aspect there is provided a computer-implemented method comprising receiving, via a communications module and from a client device, an application programming interface request that defines parameters associated with a data request; obtaining, via the communications module, real-time data from a real-time data hub based on the parameters associated with the data request; obtaining, via the communications module, non-real-time data from a data store based on the parameters associated with the data request; aggregating the real-time data and the non-real-time data according to predefined aggregation rules to generate aggregate data; and sending, via the communications module and to the client device, the aggregate data as a response to the application programming interface request.

In one or more embodiments, the method further comprises selecting a particular application programming interface to complete the data request.

In one or more embodiments, the particular application programming interface is selected based on the parameters associated with the data request.

In one or more embodiments, the application programming interface request includes a header specifying a particular format for the response to the application programming interface request.

In one or more embodiments, when aggregating the real-time data and the non-real-time data, the method further comprises translating the aggregate data into the particular format.

In one or more embodiments, the parameters associated with the data request includes at least one identifier for the data request.

In one or more embodiments, the method further comprises sending the aggregate data to a decision engine to make a real-time decision.

In one or more embodiments, at least a portion of the real-time data is obtained from the real-time data hub in communication with one or more real-time data provider computer systems.

According to another aspect there is provided a non-transitory computer readable medium having stored thereon processor-executable instructions which, when executed by at least one processor, configure the at least one processor to receive, via a communications module and from a client device, an application programming interface request that defines parameters associated with a data request; obtain, via the communications module, real-time data from a real-time data hub based on the parameters associated with the data request; obtain, via the communications module, non-real-time data from a data store based on the parameters associated with the data request; aggregate the real-time data and the non-real-time data according to predefined aggregation rules to generate aggregate data; and send, via the communications module and to the client device, the aggregate data as a response to the application programming interface request.

According to another aspect there is provided a computer system comprising at least one processor; a communications module coupled to the at least one processor; and a memory coupled to the at least one processor and storing processor-executable instructions which, when executed by the at least one processor, configure the at least one processor to receive, via the communications module and from a client device, an application programming interface request that defines parameters associated with a data request; determine at least one data provider for the data request; select a particular application programming interface to complete the data request based at least on the at least one data provider for the data request; obtain, via the communications module and from the at least one data provider, data based on the parameters associated with the data request; and engage the particular application programming interface to send, via the communications module and to the client device, the data as a response to the application programming interface request.

In one or more embodiments, when determining the at least one data provider for the data request, the processor-executable instructions, when executed by the at least one processor, configure the at least one processor to analyze the parameters associated with the data request to determine the at least one data provider.

In one or more embodiments, determining at least one data provider for the request includes determining at least a first data provider and a second data provider for the data request.

In one or more embodiments, the processor-executable instructions, when executed by the at least one processor, configure the at least one processor to: obtain, via the communications module and from the first data provider, first data based on parameters associated with the data request; and obtain, via the communications module and from the second data provider, second data based on parameters associated with the data request.

In one or more embodiments, the processor-executable instructions, when executed by the at least one processor, configure the at least one processor to aggregate the first data and the second data to generate aggregate data; and engage the particular application interface to send, via the communications module and to the client device, the aggregate data as the response to the application programming interface request.

In one or more embodiments, the data request includes a request for at least one of real-time data or non-real-time data.

In one or more embodiments, the data request includes a request for real-time data and at least one provider includes at least one of a real-time data hub in communication with one or more real-time data provider computer systems or an open banking module in communication with one or more open banking computer systems In one or more embodiments, the real-time data includes at least one of a balance of a bank account, an indication as to whether a customer has applied for one or more banking products within a particular time period, or an indication as to whether a fraud alert has been raised for one or more banking products associated with the customer.

In one or more embodiments, the data request includes a request for non-real-time data and at least one provider includes a data store.

In one or more embodiments, the particular application programming interface is further selected based on the parameters associated with the data request.

In one or more embodiments, the application programming interface request includes a header specifying a particular format for the response to the application programming interface request.

In one or more embodiments, the processor-executable instructions, when executed by the at least one processor, configure the at least one processor to translate the data into the particular format prior to sending the data as the response to the application programming interface request.

In one or more embodiments, the processor-executable instructions, when executed by the at least one processor, configure the at least one processor to send the data to a decision engine to make a real-time decision.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

In the present application, various functionalities discussed herein may be performed by a single processor or by any one of one or more processors, either alone or in combination.

Figure 1:
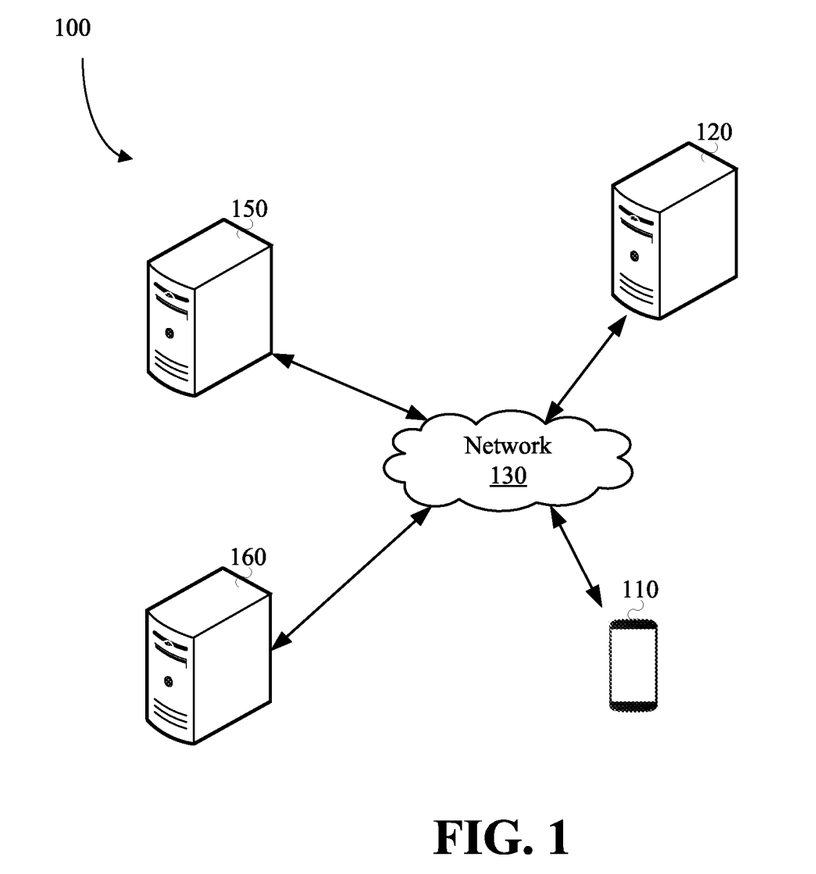
FIG. 1 is a schematic operation diagram illustrating an operating environment of an example embodiment.

FIG. 1 is a schematic operation diagram illustrating an operating environment of an example embodiment. As shown, the system 100 includes a client device 110 and a computer system 120 coupled to one another through a network 130, which may include a public network such as the Internet and/or a private network. The client device 110 and the computer system 120 may be in geographically disparate locations. Put differently, the client device 110 and the computer system 120 may be located remote from one another.

The client device 110 may be a smartphone as shown in FIG. 1. However, the client device 110 may be a computing device of another type such as for example a laptop computer, a personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The computer system 120 may be, for example, a mainframe computer, a minicomputer, or the like. In some implementations thereof, a computer system may be formed of or may include one or more computing devices. A computer system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer system may include multiple computing devices organized in a tiered arrangement. For example, a computer system may include middle tier and back-end computing devices. In some embodiments, a computer system may be a cluster formed of a plurality of interoperating computing devices.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The system 100 includes one or more data provider computer systems. The data provider computer systems may include one or more real-time data provider computer systems and/or one or more open banking computer systems. In the example shown in FIG. 1, the system 100 includes a real-time data provider computer system 150 and an open banking computer system 160. It will be appreciated that the system 100 may include more than one real-time data provider computer system and more than one open banking computer system.

The real-time data provider computer system 150 may be associated with a third party configured to provide real-time data to the computer system 120. For example, the real-time data provider computer system 150 may be associated with a credit bureau or credit score manager and as such may communicate real-time data associated with a customer such as for example a real-time credit score of the customer. As another example, the real-time data provider computer system 150 may be associated with a fraud alert system and as such may communicate real-time data associated with a customer such as for example fraud alerts and/or indications that a fraud alert has been issued for one or more banking products associated with the customer. It will be appreciated that in embodiments where the system includes a plurality of real-time data provider computer systems, each real-time data provider computer system may be associated with a different third party and/or may provide different types of real-time data. As will be described, the computer system 120 may request the real-time data in response to receiving an application programming interface request.

The open banking computer system 160 may be associated with a third party configured to provide real-time data such as open banking data to the computer system 120. For example, the open banking computer system 160 may be associated with a financial institution or a mobile application such as for example a money management application that may be configured to pull real-time data for banking products associated with a customer. The real-time data may include banking data such as for example a balance of a bank account, a balance of a mortgage, an indication as to whether a customer has applied for one or more banking products within a particular time period, a summary of deposits made within a bank account, etc.

It will be appreciated that the real-time data provider computer system 150 and the open banking computer system 160 may have access to at least some of the same real-time data. For example, the real-time data provider computer system 150 and the open banking computer system 160 may both have access to a mortgage balance of a customer and as such the computer system 120 may request real-time data from only the real-time data provider computer system 150 or the open banking computer system 160 or from both of the real-time data provider computer system 150 and the open banking computer system 160.

The computer system 120 may communicate with the real-time data provider computer system 150 and the open banking computer system 160 via the network 130 or may communicate by way of a different network such as a private network.

It will be appreciated that in one or more embodiments the system 100 may be a cloud-based system. For example, the computer system 120 may itself be virtual and the various components and modules thereof may be resident on the cloud. The computer system 120 may include one or more virtual machines or virtual processors that may be accessed via the cloud.

Figure 2:
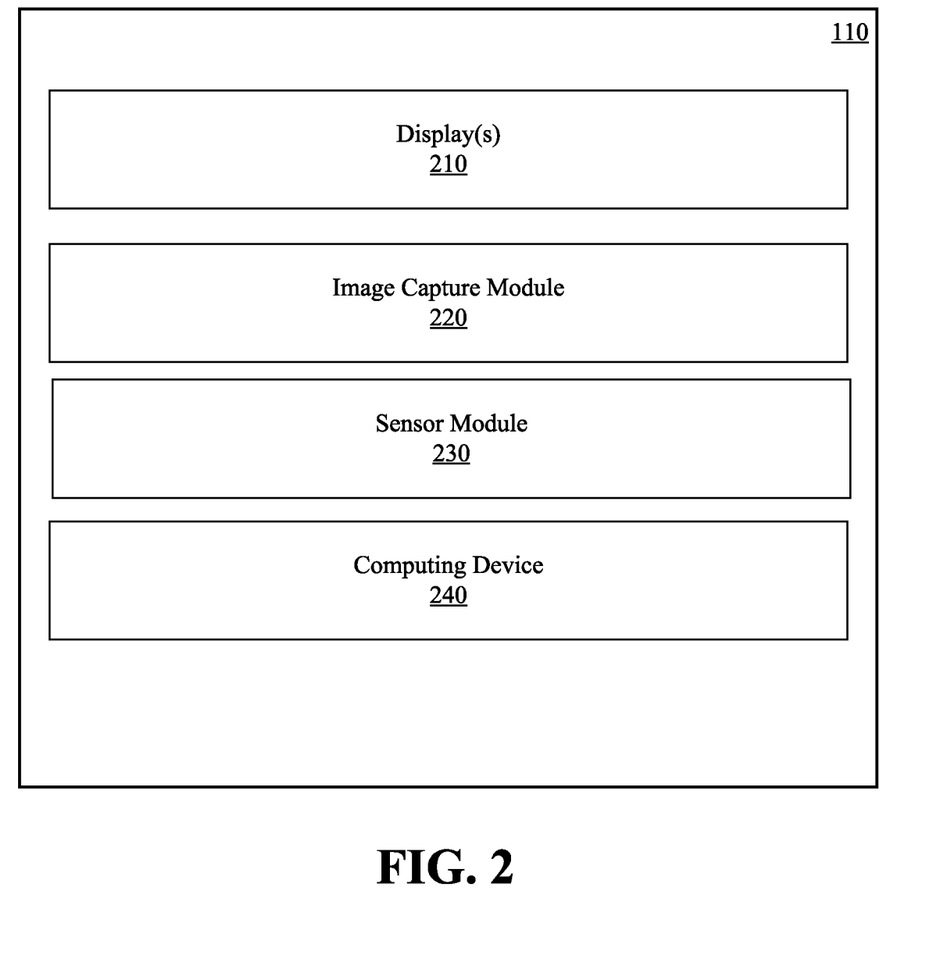
FIG. 2 is a simplified schematic diagram showing components of a client device.

FIG. 2 is a simplified schematic diagram showing components of the client device 110. The client device 110 may include modules including, as illustrated, for example, one or more displays 210, an image capture module 220, a sensor module 230, and a computing device 240.

The one or more displays 210 are a display module. The one or more displays 210 are used to display screens of a graphical user interface that may be used, for example, to communicate with the computer system 120 (FIG. 1). The one or more displays 210 may be internal displays of the client device 110.

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the client device 110. The location may be the current geographic location of the client device 110. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computing device 240 is in communication with the one or more displays 210, the image capture module 220, and the sensor module 230. The computing device 240 may be or may include at least one processor which is coupled to the one or more displays 210, the image capture module 220, and/or the sensor module 230.

Figure 3:
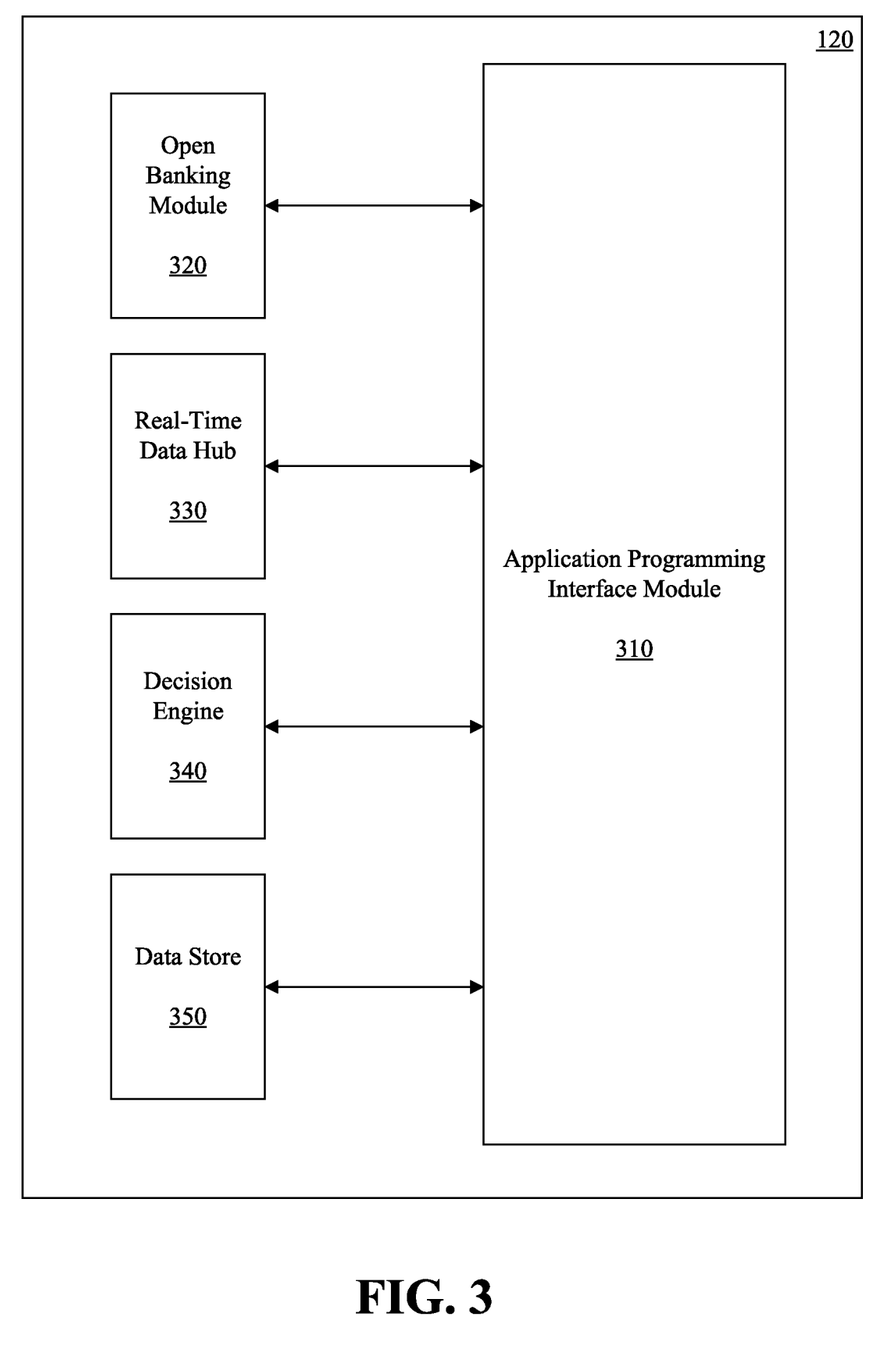
FIG. 3 is a simplified schematic diagram showing components of a computer system.

FIG. 3 is a simplified schematic diagram showing components of the computer system 120. The computer system 120 may include an application programming interface module 310, an open banking module 320, a real-time data hub 330, a decision engine 340 and/or a data store 350.

The application programming interface module 310 may act as a software intermediary that allows an application executing on the client device 110 to communicate with an application executing on the computer system 120. The application programming interface module 310 may allow the client device 110 to request data and may enable the computer system 120 to obtain and provide the requested data to the client device 110.

The application programming interface module 310 may be configured to receive application programming interface requests that define parameters. The application programming interface module 310 may perform operations to obtain data to fulfill the application programming interface requests.

In one or more embodiments, the application programming interface module 310 may include a representational state transfer (REST) application programming interface. The REST application programming interface may utilize Hypertext Transfer Protocol (HTTP) methods (e.g. GET, POST) to receive and respond to application programming interface requests. The REST application programming interface may obtain data according to application programming interface requests and may return fixed data sets as a response to the application programming interface requests.

In one or more embodiments, the application programming interface module 310 may include a GraphQL application programming interface. The GraphQL application programming interface may be hierarchical. The GraphQL application programming interface may obtain data according to application programming interface requests without under fetching or over fetching data.

The application programming interface module 310 may include both the REST application programming interface and the GraphQL schemas and may perform operations to select one of the REST and GraphQl application programming interfaces. In one or more embodiments, the computer system 120 may receive an application programming interface request in a format compliant with one of the application programming interface schemas and may translate the request into another format.

The open banking module 320 is in communication with the one or more open banking computer systems 160. The open banking module 320 may communicate with the one or more open banking computer systems 160 directly or through the network 130 to obtain real-time data such as open banking data.

The real-time data hub 330 is in communication with the one or more real-time data provider computer systems 150. The real-time data hub 330 may communicate with the one or more real-time data provider computer systems directly or through the network 130 to obtain real-time data.

Although the real-time data hub 330 and the open banking module 320 are shown as separate modules, it will be appreciated that in one or more embodiments the real-time data hub 330 may include the open banking module 320.

The decision engine 340 may be configured to analyze data to make real-time decisioning. For example, the decision engine 340 may include a number of predefined rules that may be used to analyze data to make real-time decisioning such as for example real-time borrowing decisions. The borrowing-decisions may be binary. For example, the decision engine 340 may generate a "YES" or a "NO" decision based on the analysis of the data according to the predefined rules.

The data store 350 may include various data records. At least some of the data records may store data such as for example non-real-time data. The non-real-time data may include data associated with one or more customers. The data may be, for example, borrowing data that may be used to make a real-time borrowing decision. Examples of non-real-time data may include a name, an address, an email address, a data of birth, a social security number, etc. At least some of the non-real-time data may include data required to comply with Know-Your-Customer (KYC) compliance requirements. The non-real-time data may additionally include historical data or data previously obtained for the customer from one or more data providers. In one or more embodiments, the non-real-time data may be obtained from the open banking module 320 and/or the real-time data hub 330 and may be stored in the data store 350. For example, the non-real-time data may include historical data relating to a customer's credit score and this may be obtained, for example, every six (6) months from a data provider such as the real-time data provider computer system 150. In one or more embodiments, at least some of the non-real-time data may be used by the computer system 120 to obtain real-time data and/or open banking data from one or more data providers.

The computer system 120 may precondition the data prior to be stored in the data store such that it may be readily available for use by the computer system 120. For example, the computer system 120 may periodically obtain real-time data from the real-time data provider computer system 150 and/or the open banking computer system 160 by way of the real-time data hub 330 and/or the open banking module 320, respectively. The data may be passed through a batch processing module configured to automatically batch the data. The data that is batch processed may then be passed through a data ingestion module and an extract, transform and load (ETL) module where it is then stored in the data store. In this manner, the data stored in the data store may be readily available for use in generating an application programming interface response.

Figure 4:
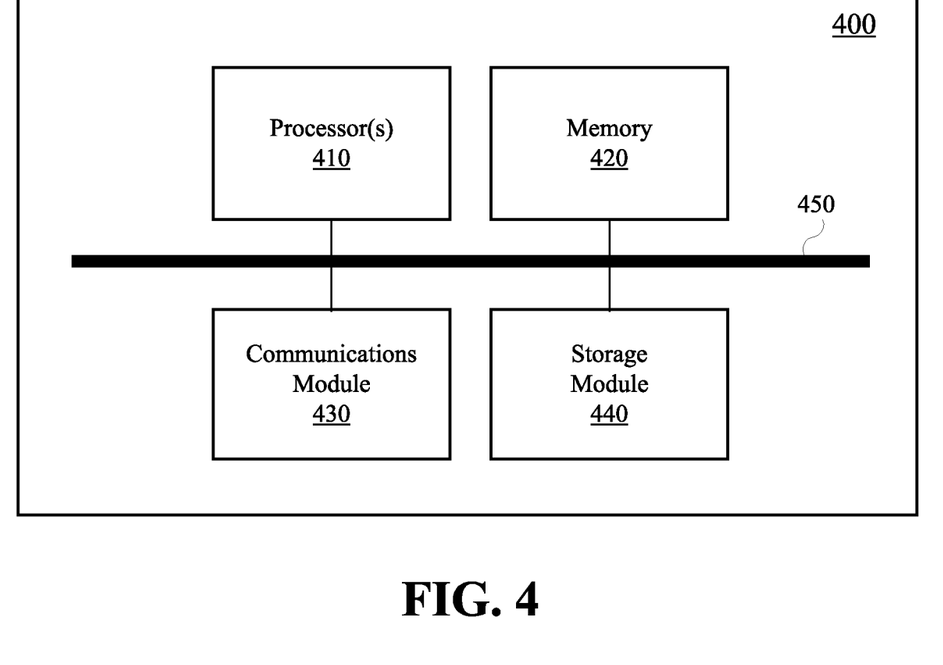
FIG. 4 is a high-level schematic diagram of an example computer device.

Referring now to FIG. 4, a high-level operation diagram of an example computing device 400 is shown. In some embodiments, the computing device 400 may be exemplary of the computing device 240 (FIG. 2), the computer system 120, the real-time data provider computer system 150 and/or the open banking computer system 160.

The example computing device 400 includes a variety of modules. For example, as illustrated, the example computing device 400 may include at least one processor 410, a memory 420, a communications module 430, and/or a storage module 440. As illustrated, the foregoing example modules of the example computing device 400 are in communication over a bus 450.

The at least one processor 410 is a hardware processor. The at least one processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computing device 400.

The communications module 430 allows the example computing device 400 to communicate with other computer or computing devices and/or various communications networks. For example, the communications module 430 may allow the example computing device 400 to send or receive communications signals. Communications signals may be sent or received according to one or more protocols or according to one or more standards. For example, the communications module 430 may allow the example computing device 400 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 430 may allow the example computing device 400 to communicate using near-field communication (NFC), via Wi-Fi (™), using Bluetooth (™) or via some combination of one or more networks or protocols. In some embodiments, all or a portion of the communications module 430 may be integrated into a component of the example computing device 400. For example, the communications module may be integrated into a communications chipset. In some embodiments, the communications module 430 may be omitted such as, for example, if sending and receiving communications is not required in a particular application.

The storage module 440 allows the example computing device 400 to store and retrieve data. In some embodiments, the storage module 440 may be formed as a part of the memory 420 and/or may be used to access all or a portion of the memory 420. Additionally or alternatively, the storage module 440 may be used to store and retrieve data from persisted storage other than the persisted storage (if any) accessible via the memory 420. In some embodiments, the storage module 440 may be used to store and retrieve data in a database. A database may be stored in persisted storage. Additionally or alternatively, the storage module 440 may access data stored remotely such as, for example, as may be accessed using a local area network (LAN), wide area network (WAN), personal area network (PAN), and/or a storage area network (SAN). In some embodiments, the storage module 440 may access data stored remotely using the communications module 430. In some embodiments, the storage module 440 may be omitted and its function may be performed by the memory 420 and/or by the at least one processor 410 in concert with the communications module 430 such as, for example, if data is stored remotely. The storage module may also be referred to as a data store.

Software comprising instructions is executed by the at least one processor 410 from a computer-readable medium. For example, software may be loaded into random-access memory from persistent storage of the memory 420. Additionally or alternatively, instructions may be executed by the at least one processor 410 directly from read-only memory of the memory 420.

Figure 5:
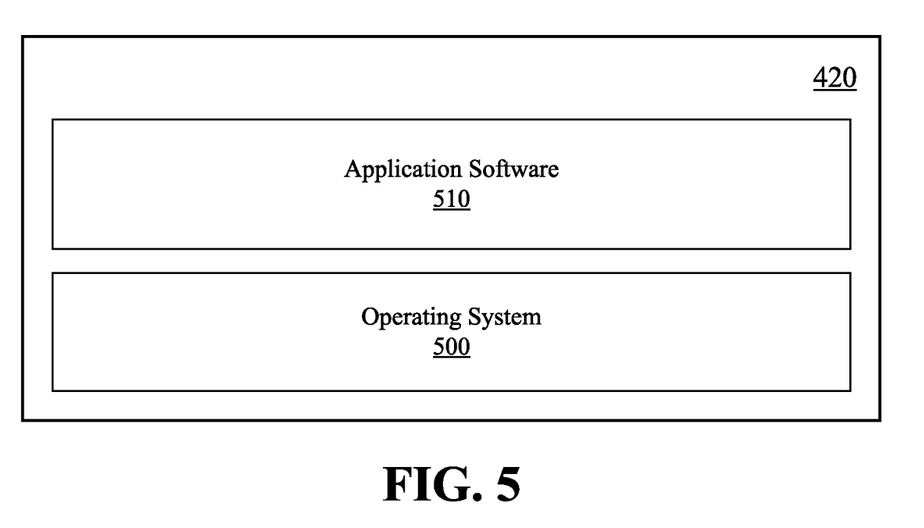
FIG. 5 shows a simplified organization of software components stored in a memory of the example computer device of FIG. 4.

FIG. 5 depicts a simplified organization of software components stored in the memory 420 of the example computing device 400 (FIG. 3). As illustrated, these software components include an operating system 500 and an application 510.

The operating system 500 is software. The operating system 500 allows the application 510 to access the at least one processor 410, the memory 420, and the communications module 430 of the example computing device 400 (FIG. 4). The operating system 500 may be, for example, Google (™) Android (™), Apple (™) iOS (™), UNIX (™), Linux (™), Microsoft (™) Windows (™), Apple OSX (™) or the like.

The application 510 adapts the example computing device 400, in combination with the operating system 500, to operate as a device performing a particular function. For example, the application 510 may cooperate with the operating system 500 to adapt a suitable embodiment of the example computing device 400 to operate as the computing device 240 (FIG. 2), the computer system 120, the real-time data provider computer system 150 and/or the open banking computer system 160.

While a single application 510 is illustrated in FIG. 5, in operation the memory 420 may include more than one application 510 and different applications 510 may perform different operations. For example, in at least some embodiments in which the computing device 400 is functioning as the client device 110, the applications 510 may include an application for displaying a graphical user interface associated with sending an application programming interface request.

Figure 6:
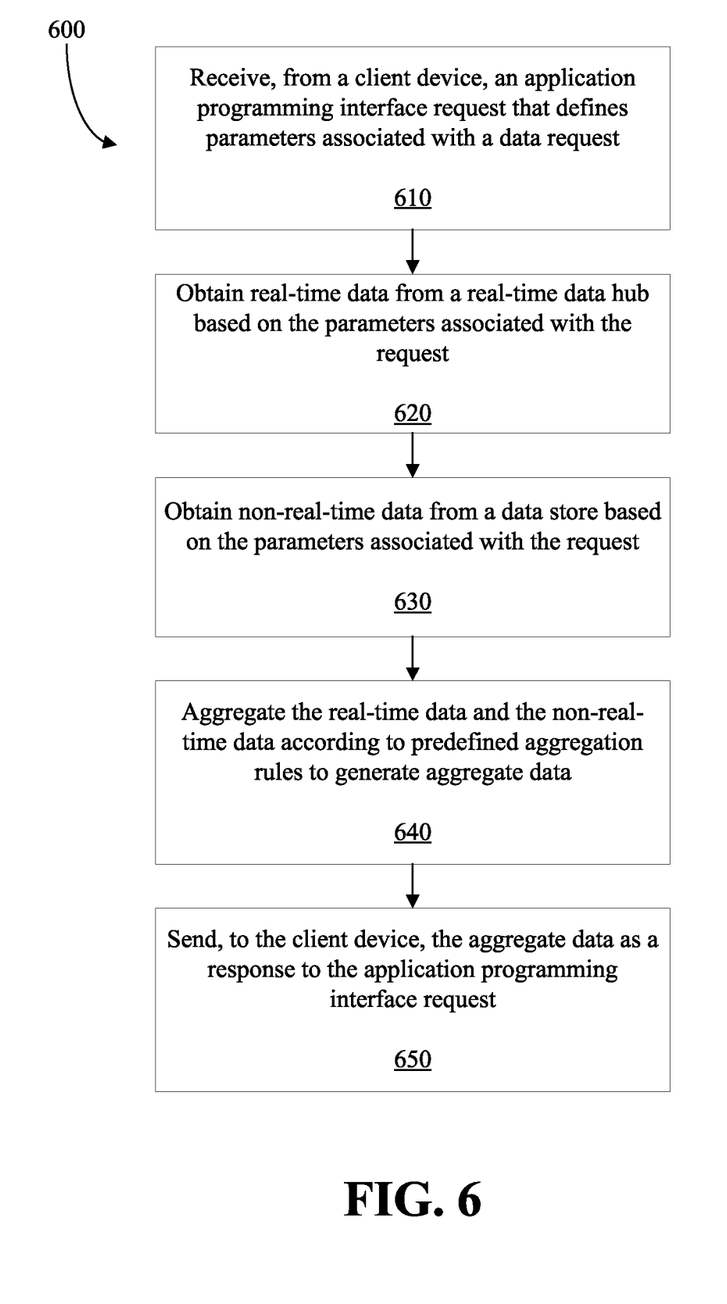
FIG. 6 is a flowchart showing operations performed by a computer system in responding to an application programming interface request according to an embodiment.

The computer system 120 may be configured to receive application programming interface requests and may perform operations to respond thereto. Reference is made to FIG. 6, which illustrates, in flowchart form, a method 600 for responding to an application programming interface request. The method 600 may be implemented by a computing device having suitable processor-executable instructions for causing the computing device to carry out the described operations. The method 600 may be implemented, in whole or in part, by the computer system 120. At least some of the operations may be performed by the application programming interface module 310 of the computer system 120.

The method 600 includes receiving, from a client device, an application programming interface request that defines parameters associated with a data request (step 610).

The application programming interface request may be received from the client device 110. For example, a user operating the client device 110 may generate the application programming interface request within a particular software application or mobile application executing on the client device 110.

The application programming interface defines parameters associated with a data request. The parameters may include, for example, identifying information for obtaining the data. In one or more embodiments, the identifying information may include at least one of a first name, a last name, a date of birth, a social security number, or an email address, etc.

The parameters may additionally include a scope of the data being requested. For example, the application programming interface request may include a request for a credit score of a particular customer and as such the parameters may include identifying information of the particular customer and a request for the credit score.

In one or more embodiments, the parameters associated with the data request may include a request for information required to make a lending or borrowing decision. For example, the parameters may include a request for information about assets owned by the customer, information abouts debts or financial obligations associated with the customer, a credit score, etc.

In response to receiving the application programming interface request, the computer system 120 may analyze the parameters associated with the data request to identify one or more data providers for obtaining the requested data. In one or more embodiments, the computer system 120 may determine that at least some of the requested data includes real-time data and at least some of the requested data includes non-real-time data.

In one or more embodiments, the computer system 120 may select a particular application programming interface to complete the data request. For example, the computer system 120 may select the particular application programming interface based on the parameters associated with the data request. For example, it may be determined that obtaining a fixed data set may be sufficient to satisfy the data request and as such the computer system 120 may select a first application programming interface such as for example the REST application programming interface. As another example, it may be determined that utilizing the first application programming interface may result in under fetching or over fetching data and as such the computer system 120 may select a second application programming interface such as for example the GraphQL application programming interface to complete the data request. In these embodiments, the application programming interface may be sent in a particular format such as for example in the REST application programming interface format and as such the computer system 120 may translate the application programming request into a format compliant with the selected particular application programming interface and this may be done using predefined computer program code. As another example, the computer system 120 may identify one or more data providers for the data request and may select a particular application programming interface to complete the data request based at least on the one or more data providers. In this example, it may be determined that the only data provider required to be engaged may include the data store and as such, since the data stored in the data store is in a format readily available for use in generating an application programming interface response, the computer system may select the REST application programming interface to complete the data request.

In one or more embodiments, the application programming interface request may include a header specifying a particular format for the response to the application programming interface request. The format may specify predefined aggregate rules that are requested by the client device 110 and this may include, for example, specifying caching behavior for the application programming interface response. The format may additionally or alternatively specify a format of the application programming interface response such as a JavaScript Object Notation (JSON) or Extensible Markup Language (XML) format.

The method 600 includes obtaining real-time data from a real-time data hub based on the parameters associated with the request (step 620).

The computer system 120 may determine that at least some of the requested data includes real-time data. As such, the computer system 120 may engage the real-time data hub to communicate data requests to one or more real-time data provider computer systems 150 and/or may engage the open banking module to communicate data requests to one or more open banking computer systems 160.

To obtain the real-time data, the computer system 120 may communicate the one or more parameters associated with the request to the real-time data hub or open banking module where the one or more parameters may be sent to the one or more real-time data provider computer systems and/or the one or more open banking computer systems. For example, the one or more parameters may include an email address, a first name and a last name of a customer and as such the one or more parameters may be communicated to the one or more real-time data provider computer systems and/or the one or more open banking computer systems.

In response to receiving the one or more parameters, the one or more real-time data provider computer systems and/or the one or more open banking computer systems may fetch the requested real-time data and may send the real-time data to the computer system 120.

In one or more embodiments, the computer system 120 may obtain the real-time data by engaging one or more application programming interfaces associated with one or more data provider computer systems. For example, the computer system 120 may generate an application programming interface request that includes identifying information of a customer and may communicate the request to an application programming interface associated with the data provider computer system.

The method 600 includes obtaining non-real-time data from a data store based on the parameters associated with the request (step 630).

The computer system 120 may determine that at least some of the requested data includes non-real-time data. For example, the computer system 120 may consult the data store to determine what non-real-time data is currently stored for the customer and may determine that the non-real-time data may be sufficient to satisfy the data request. For example, the computer system 120 may determine that the application programming interface request includes a request for a recent credit score for a particular customer. The computer system 120 may consult the data store and may determine that the data store has readily available a credit score for the customer that was obtained within the last six (6) months and therefore is sufficient to satisfy the data request.

In one or more embodiments, the computer system 120 may obtain non-real-time data of a customer that may be used to obtain the real-time data of the customer. For example, the application programming interface request may include an email address of a customer and the computer system 120 may consult the data store to determine a first name, a last name, and a security number of the customer. The computer system 120 may use the non-real-time data to obtain the real-time data and this may be done during the step 620 of the method 600.

The method 600 includes aggregating the real-time data and the non-real-time data according to predefined aggregation rules to generate aggregate data (step 640).

Since the real-time data and the non-real-time data are obtained from a variety of sources, the computer system 120 is required to aggregate the data. In one or more embodiments, a data integration tool may be engaged to aggregate the data. For example, a data integration tool such as for example Apache (™) NiFi, Apache (™) Camel, etc. may be engaged to aggregate the data, transform the data, and load it into a unified format.

In one or more embodiments, aggregating the real-time data and the non-real-time data may include passing the data through a batch processing module configured to automatically batch the data. The data that is batch processed may then be passed through a data ingestion module and an extract, transform and load (ETL) module. For example, the real-time data and the non-real time data may be transformed into a common format or schema. In one or more embodiments, an ETL tool may be engaged such as Apache (™) Spark, Apache (™) Beam, etc.

In one or more embodiments, additional tools may be used to aggregate the data such as for example data wrangling tools, data virtualization tools, message brokers, etc. In one or more embodiments, the computer system 120 may include one or more predefined data transformation scripts that may be used to transform the real-time data and non-real-time data into a particular format.

In one or more embodiments, the predefined aggregation rules may be obtained from the header of the application programming interface request. For example, the header may specify a particular format for the data request and as such the real-time data and the non-real-time data may be combined and/or translated to generate aggregate data in the particular format.

The method 600 includes sending, to the client device, the aggregate data as a response to the application programming interface request (step 650).

The computer system 120 generates a response to the application programming request that includes the aggregate data. As mentioned, the aggregate data may be required to be translated into a particular format and as such the computer system 120 may send the aggregate data in the particular format as a response to the application programming interface request.

In manners described herein, real-time data and non-real-time data may be obtained from a variety of sources in a variety of formats. Through use of the application programming interface, the computer system 120 is able to receive application programming interface requests that define parameters for a data request, is able to obtain data to satisfy the data request from a large number of data sources, and is able to provide a response to the application programming interface request that includes the aggregate data.

In one or more embodiments, the application programming interface request may be associated with obtaining data to make a real-time decision or may define parameters that include a request to make a real-time decision. In one or more embodiments, the computer system 120 may include or may be in communication with a decision engine that may be configured to analyze aggregate data to make the real-time decision. For example, the decision engine may include a plurality of predefined rules for making the real-time decision. The aggregate data may be provided as input to the decision engine and may be analyzed to make a real-time decision. The decision engine may generate a binary response to the request to make the real-time decision.

In one or more embodiments, the application programming interface request may be associated with obtaining data to make a real-time borrowing decision or may define parameters that include a request to make a real-time borrowing decision. In one or more embodiments, the computer system 120 may include or may be in communication with a decision engine that may be configured to analyze aggregate data to make the real-time borrowing decision. For example, the decision engine may include a plurality of predefined rules for making the real-time decision. The aggregate data may be provided as input to the decision engine and may be analyzed to make a real-time decision. The decision engine may generate a binary response to the request to make the real-time decision.

The system described herein may be utilized in the following example. A customer may request a new credit account at a financial institution. The credit account may be, for example, a credit card account. Rather than gathering customer data from random data sources, the financial institution may engage the system by sending an application programming interface request from a client device to the computer system. The application programming interface request may define parameters associated with a data request, that is, types of information that are required to make a real-time borrowing decision on the new credit account. In response, the computer system may engage the real-time data hub to obtain the requested data from one or more data provider computer systems and/or may engage the data store to obtain the requested data therefrom. The computer system 120 may provide one or more of the customers first name, last name, date of birth, etc. in order to obtain the requested data. The requested data may be aggregated into a particular format and may then be communicated to the decision engine where it may be analyzed according to predefined borrowing rules to make a real-time borrowing decision as to whether or not to open the new credit account. The decision engine may generate a binary response as to whether or not to open the new credit account and the computer system may communicate the binary response as a response to the application programming interface request.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A computer system comprising:
  at least one processor;
  a communications module coupled to the at least one processor; and
  a memory coupled to the at least one processor and storing processor-executable instructions which, when executed by the at least one processor, configure the at least one processor to:
    receive, via the communications module and from a client device, an application programming interface request that includes a header specifying predefined aggregation rules and defines parameters associated with a data request;

obtain, via the communications module, real-time data from a real-time data hub based on the parameters associated with the data request;

obtain, via the communications module, non-real-time data from a data store based on the parameters associated with the data request;

aggregate the real-time data and the non-real-time data according to the predefined aggregation rules specified in the header to generate aggregate data; and send, via the communications module and to the client device, the aggregate data as a response to the application programming interface request.

2. The computer system of claim 1, wherein the processor-executable instructions, when executed by the at least one processor, configure the at least one processor to:

select a particular application programming interface to complete the data request.

3. The computer system of claim 2, wherein the particular application programming interface is selected based on the parameters associated with the data request.

4. The computer system of claim 1, wherein the header a particular format for the response to the application programming interface request.

5. The computer system of claim 1, wherein when aggregating the real-time data and the non-real-time data, the processor-executable instructions, when executed by the at least one processor, configure the at least one processor to:

translate the aggregate data into the particular format.

6. The computer system of claim 1, wherein the parameters associated with the data request include at least one identifier for the data request.

7. The computer system of claim 1, wherein the processor-executable instructions, when executed by the at least one processor, configure the at least one processor to:

send the aggregate data to a decision engine to make a real-time decision.

8. The computer system of claim 1, wherein at least a portion of the real-time data is obtained from the real-time data hub in communication with one or more real-time data provider computer systems.

9. The computer system of claim 1, wherein at least a portion of the non-real-time data is obtained from a data store.

10. The computer system of claim 1, wherein at least a portion of the real-time data is obtained from an open banking module in communication with one or more open banking computer systems.

11. The computer system of claim 1, wherein the real-time data includes at least one of a balance of a bank account, an indication as to whether a customer has applied for one or more banking products within a particular time period, or an indication as to whether a fraud alert has been raised for one or more banking products associated with the customer.

12. A computer-implemented method comprising:

receiving, via a communications module and from a client device, an application programming interface request that includes a header specifying predefined aggregation rules and defines parameters associated with a data request;

obtaining, via the communications module, real-time data from a real-time data hub based on the parameters associated with the data request;

obtaining, via the communications module, non-real-time data from a data store based on the parameters associated with the data request;

aggregating the real-time data and the non-real-time data according to the predefined aggregation rules specified in the header to generate aggregate data; and sending, via the communications module and to the client device, the aggregate data as a response to the application programming interface request.

13. The computer-implemented method of claim 12, further comprising:

selecting a particular application programming interface to complete the data request.

14. The computer-implemented method of claim 13, wherein the particular application programming interface is selected based on the parameters associated with the data request.

15. The computer-implemented method of claim 12, wherein the header specifies a particular format for the response to the application programming interface request.

16. The computer-implemented method of claim 12, wherein when aggregating the real-time data and the non-real-time data, the method further comprises:

translating the aggregate data into the particular format.

17. The computer-implemented method of claim 12, wherein the parameters associated with the data request includes at least one identifier for the data request.

18. The computer-implemented method of claim 12, further comprising:

sending the aggregate data to a decision engine to make a real-time decision.

19. The computer-implemented method of claim 12 wherein at least a portion of the real-time data is obtained from the real-time data hub in communication with one or more real-time data provider computer systems.

20. A non-transitory computer readable medium having stored thereon processor-executable instructions which, when executed by at least one processor, configure the at least one processor to:

receive, via a communications module and from a client device, an application programming interface request that includes a header specifying predefined aggregation rules and defines parameters associated with a data request;

obtain, via the communications module, real-time data from a real-time data hub based on the parameters associated with the data request;

obtain, via the communications module, non-real-time data from a data store based on the parameters associated with the data request;

aggregate the real-time data and the non-real-time data according to the predefined aggregation rules specified in the header to generate aggregate data; and send, via the communications module and to the client device, the aggregate data as a response to the application programming interface request.

* * * * *